April 6, 1948.  S. B. SETTLE  2,439,266
METHOD OF FABRICATING TANKS
Filed Dec. 16, 1943  2 Sheets-Sheet 1

Inventor:
Samuel B. Settle,
By Cushman, Darby & Cushman
Attorneys.

April 6, 1948. S. B. SETTLE 2,439,266
METHOD OF FABRICATING TANKS
Filed Dec. 16, 1943 2 Sheets-Sheet 2
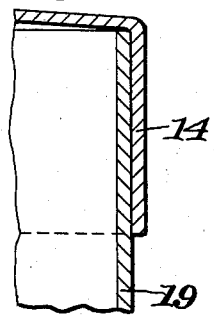
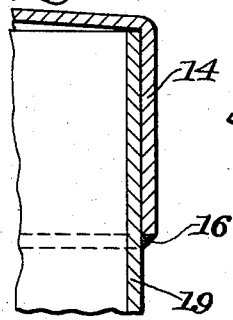
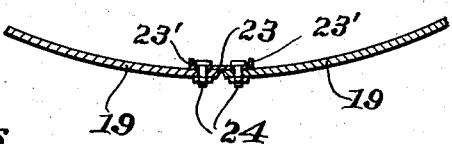
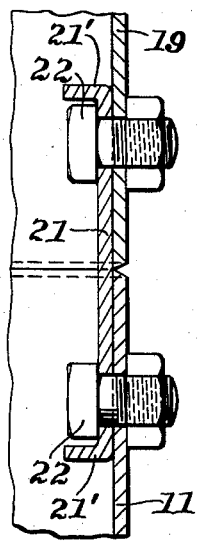
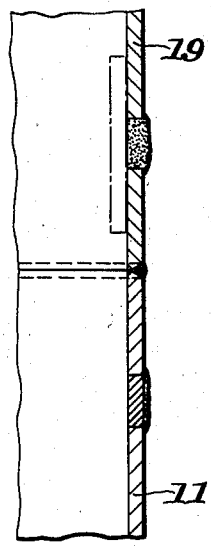
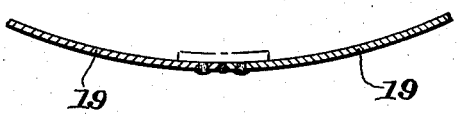
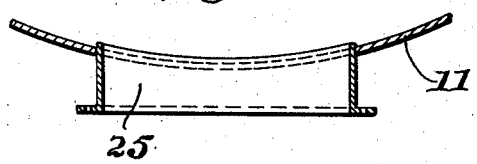
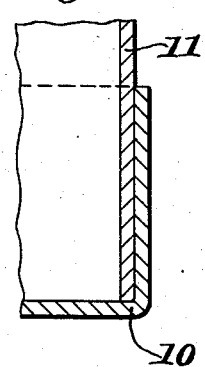
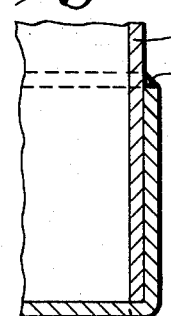
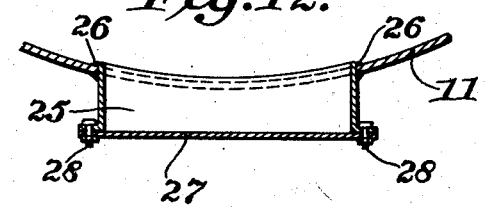
Inventor:
Samuel B. Settle,
By Cushman, Darby & Cushman
Attorneys.

Patented Apr. 6, 1948

2,439,266

UNITED STATES PATENT OFFICE 2,439,266

METHOD OF FABRICATING TANKS

Samuel B. Settle, Parkersburg, W. Va., assignor to Casper A. Ruf, Parkersburg, W. Va.

Application December 16, 1943, Serial No. 514,550

3 Claims. (Cl. 29—148.2).

In the construction of storage tanks of large sizes for different commodities, one, for example, being oil, tanks of any considerable capacity are ordinarily built of preformed sections which are assembled in final relation to give the completed structure. One method which has been followed is to assemble the sections which go to make up the tank at the factory, and then transport the completed tank to the field or place of use. The objection to this is that it presents transportation difficulties, in that the bulky completed tank cannot be economically transported because of its size. Another plan of fabrication which has been proposed is to preform the sections, ship them to the field or place of use, and there assemble them. This method of fabricating such tanks has the advantage that many of the sections can be nested together and transported much more economically, because of saving in space, than the entire tank when fabricated at the shop.

The present invention has for its object the improvement of the last named method of preforming the sections, including cutting to shape, bending to proper form, finishing the meeting edges, and punching for temporary setting up and assembling, transporting them to the field or place of use, and there assembling them, and presents features of novelty over the fabricating plans now in use as known to me.

In the drawings herewith there is illustrated the tank and method of assembling, and in those drawings:

Figure 3 is a view in section on an enlarged scale of the top of the tank with the cover in place.

Figure 4 is a view similar to Figure 3, showing the parts welded together.

Figure 5 is a view substantially on the line 5—5, Figure 1, looking in the direction of the arrows and showing the assembled sections temporarily held together, ready for the final step of permanent assembly by welding.

Figure 6 is a view similar to Figure 5 with the temporary holding means removed and the sections assembled and the seams welded and sealed.

Figure 7 is a view of a portion of a bottom of the tank and the side wall.

Figure 8 is a view similar to Figure 7 with the parts welded together.

Figure 9 is a sectional view of a side wall of the tank showing the temporary fastening means for a vertical seam.

Figure 10 is a view similar to Figure 9 with the temporary fastening means removed and the sections permanently welded.

Figure 11 is a sectional view through the side wall of the tank showing the outlet of the cleanout opening, and Figure 12 is a view similar to Figure 11, on substantially the line 12—12, Figure 1, showing the clean-out outlet permanently welded to the side walls and provided with its sealing cover.

Figure 1:
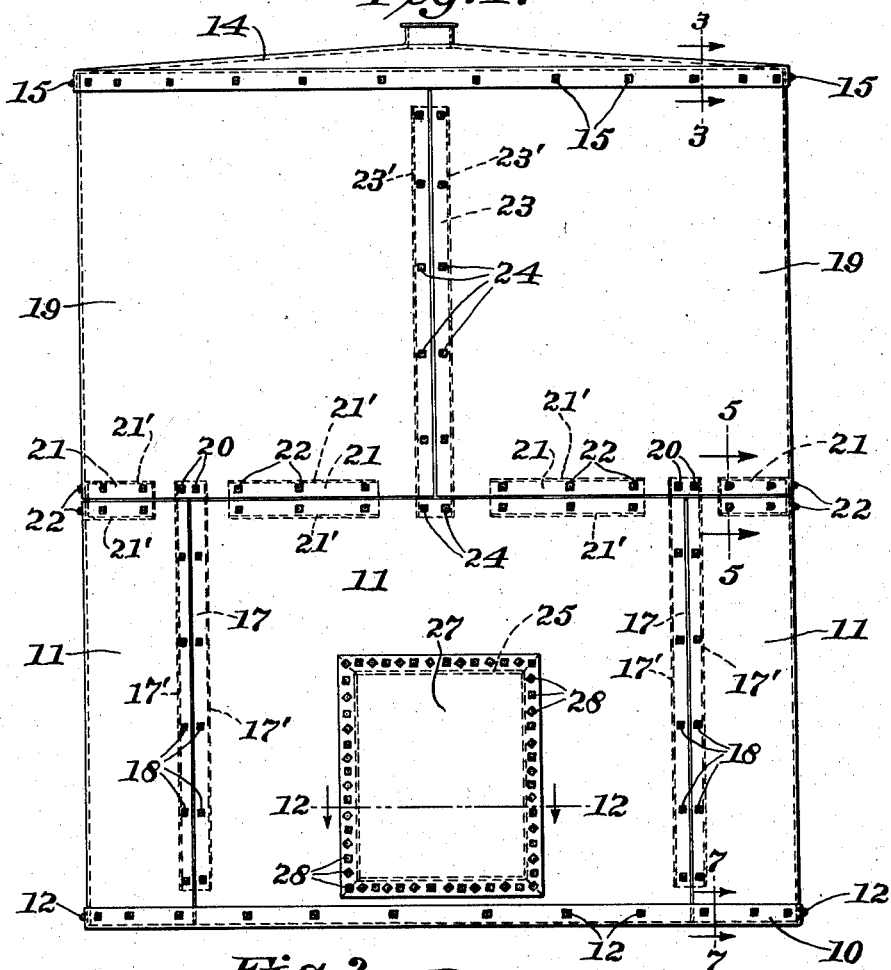
Figure 1 is a view in elevation of an assembled tank in its temporary condition of assembly.

The invention contemplates the assembly of complementary sections of which the tank is built in proper relation, with temporary fastening means, such as templets and bolts, to maintain them in final position, following which temporary set-up the seams between the assembled sections will be permanently welded together, after which or during which welding operation the templets and their securing bolts will be removed, the openings in the sections through which the bolts pass sealed, with the result that a tank having perfectly sealed walls is provided, the erection of the tank being materially expedited by the method shown and described.

Referring to the drawings by numbers, like numbers indicating like parts in the several views, 10 indicates the bottom of the tank, which preferably will be formed in a single piece, as shown, this bottom 10 having the upstanding circumferential flange portion to receive the side wall sections of the tank. Disposed within the flange of the bottom 10 are a series of side wall sections 11, any convenient number of such sections being provided, and these are preformed to fit snugly the flange on the bottom 10, with their vertical meeting edges so aligned as to give complete and symmetrical assembly at the vertical edges of the sections, as shown in Figures 9 and 10.

Figure 2:
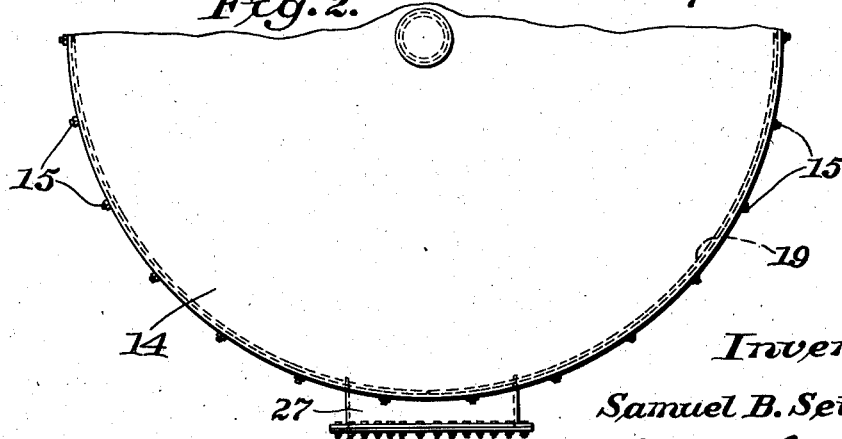
Figure 2 is a top plan view of a portion of the tank shown in Figure 1.

The lower ends of the sections 11 will be positioned within the flanged bottom 10, as shown in Figures 7 and 8, the dimensions and form of the parts being such as to provide a close sliding fit, and after they are so assembled they will be held together temporarily by bolts 12, as shown in Figures 1 and 2. If necessary, templets may be used, in connection with the bolts in the same manner that they are used in fastening the horizontal and vertical seams to the rest of the structure, as hereinafter disclosed. With the circular flanged bottom and the circularly shaped segments, however, both the bottom and the top may be conveniently assembled prior to welding by the use of bolts. After the temporary holding bolts 12 have been tightened so as to bring the assembled parts to their final position, the bottom 10 and the sections 11 will be welded to permanently set the seam, as shown at 13 in Figure 8, and thereafter the temporary fastening bolts 12 can be removed, leaving the bottom 10 and the sections 11 in permanently sealed relation. The weld 13 may be applied as a continuous weld around the tank or tack welding at different points may be adopted, after which the bolts 12 are removed, such tack welding serving to hold the parts together. After the bolts 12 are removed the weld 13 may be completed around the entire tank.

The same method of assembly will be adopted in connection with the top 14 and the sections 19, as shown in Figures 3 and 4, where the top 14 is placed over the assembled sections 19, temporarily held in place by the bolts 15, as shown in Figure 1, and afterwards the weld 16 is provided so as to permanently seal the top and the side sections. The vertically disposed sections 11 and 19 may be duplicates of one another, which would be advantageous insofar as production, transportation, and assembling are concerned. The assembly and welding of the top will, of course, be the last step in fabricating the tank in order that the build-up may proceed in an orderly way.

Vertically disposed sections 11 and 19 are assembled, as shown in Figure 1, with their bevel cut vertical edges in contact, and are then temporarily fastened by means of the templets 17 and 23 and the bolts 18 and 24, it being understood that in preforming the sections they are punched with suitable bolt holes. In order to avoid piercing the sections 11 and 19 with a multiplicity of bolt holes, I preferably space the bolts 18 and 24 at a convenient and economical distance apart, so as to securely hold the sections 11 and 19 in assembled position, but reduce so far as possible the number of bolt holes in the sections 11 and 19. It will be seen in Figure 1 that the temporary holding plates or templets 17 preferably extend beyond the upper edge of the lower sections 11, so as to lap on the lower edge of the upper sections 19 where they are temporarily secured by the bolts 20. This lapping of the vertical templets on the adjoining edges of the sections is of considerable value, in that the templets serve to guide and center the sections with respect to each other, and when fastened by bolts, hold the adjacent sections firmly in place. Horizontally placed templets 21 are provided at intervals around the tank so as to hold succeeding sections in assembled relation, these horizontal templets lapping the adjacent edges of the sections and being temporarily bolted by the bolts 22 to the successive sections of the tank. Two sections are shown in the present form, but it is to be understood that as many sections may be stacked and secured as may be desired to give a tank of the needed size and capacity. The upper sections 19 are secured by the temporary templets 23, which are bolted by the bolts 24 so as to hold the assembled sections 19, with their edges in proper alignment and the temporary holding plate or templet 23 will lap the upper edges of the lower sections 11, as shown in Figure 1.

In order to prevent rotation of the bolts during assembly of the preformed sections, means are provided for holding the bolts against turning when the units are set up. One convenient means is to provide templets used in temporarily securing the sections 11 and 19 together prior to the welding operation with means for preventing the bolts, by which the sections are temporarily held, from turning when the nuts are screwed onto the threaded ends of the bolts. One means of accomplishing this is shown in detail in Figure 5, where the horizontally placed templet 21 is provided with inturned edges 21', so disposed relative to the bolt heads 22 that they will prevent rotation of the bolts when the nuts are screwed up, and thus avoid the necessity of a workman holding the bolts against rotation when the sections are temporarily set up. It will be understood that such bolt head engaging means will be applied to the vertical templets 17 and 23, the inturned or bent edges being indicated at 17' and 23', respectively, in dotted lines in Figure 1. Also see Figure 9 for a sectional detail, showing the use of such a templet, provided with inturned edges.

The vertical seams will, as shown, be staggered relative to one another so as to give greater strength and facility in assembling, the staggered relation of the vertical seams ensuring an assembly in which the vertical seams of one section lie opposite and are attached by horizontal seams to a solid unseamed area of the succeeding section.

As shown in Figures 5, 6, and 9, the meeting edges of the sections, both horizontal and vertical, have an outwardly flaring bevelled shear-cut with the inner knife-like edges of the sections in close contact, thus providing an outwardly opening V-shaped seam well adapted to receive the welding material, as shown in Figure 6, and to minimize the deposit of welding material, since it cannot escape inwardly of the closely contacting inner edges of the bevelled seam, and yet sufficient welding area is provided to form a completely welded and sealed seam.

After the weld to permanently set the seam, whether tack welding or complete welding has been applied, the templets and bolts, both vertical and horizontal, may be removed and removal of these strips will, of course, take place prior to securing the top 14 to the assembled segments and will preferably take place as the work progresses and the assembly rises. Removal of the fastening bolts of the securing strips or templets leaves, of course, the bolt holes, as will be apparent from Figures 6 and 10, and these holes, which, as stated, are widely spaced so as to minimize their number, may then be filled. This may be conveniently done in any suitable manner by plugging them. This plugging may be accomplished in various ways. For example, buttons or filler plugs may be inserted and welded in, but it has been found that they may be conveniently plugged by welding material which may be fed into the holes from the outside against a suitably held temporary holding plate of any suitable material and construction, as illustrated in dotted lines in Figures 6 and 10, so as to prevent passing of the welding material into the interior of the tank. The use of templets and bolts for temporarily fastening the abutting edges of the complementary sections together has a distinct advantage, in that slight distortions of the sections at their meeting edges may be straightened out and true alignment of the edges secured by increasing or decreasing the tension of the bolts so that by such adjustment the abutting edges are brought into exact and proper relation for the subsequent welding operation.

It is essential, or at least desirable, that for purposes of cleaning, tanks of this character be provided with clean-out openings, and in the present construction I have shown a clean-out flange 25, which, as shown in Figure 11, will be inserted in a suitably shaped opening in a wall of a section 11 near the bottom and then welded in place, as at 26, as shown in Figure 12. This clean-out flange will have a cover 27 which will be removably mounted by means of bolts 28, these being sufficient in number to give a perfectly tight seal against the contents of the tank. This flange clean-out 25 may be assembled with the tank section to which it is applied, either at the shop or at the point of assembly, whichever is regarded as preferable, and the section 11 carrying the clean-out outlet may be positioned at any point circumferentially of the tank which is most convenient. One clean-out is here shown but obviously more than one may be provided, if desired.

From the foregoing, it will be seen that there is provided a method of tank fabrication which permits preforming of the various sections of which the tank is built up, shipping them in preformed condition to the point of assembly, there temporarily securing them in their assembled position in a progressive fashion, and finally welding them into a complete structure.

Such variations from the details here shown as do not depart from the principles herein disclosed are to be regarded as within the purview of my invention.

I claim:

1. The method of fabricating and erecting cylindrical tanks of metal which are large enough to require multiple tiers of side plates separated by a horizontal tank seam, which comprises shop forming a circular base with an upstanding perimeter flange with spaced bolt holes therein, shop forming a plurality of metal side plates for the tank of rectangular outline with bolt openings similarly spaced along the edges thereof, each of said plates consisting of a single sheet of metal, shop bending said plates along one dimension to the curvature of the perimeter flange of said base, shop forming vertical and horizontal sets of temporary edge connecting templets with bolt holes therein equally spaced with the holes in said plates, the templets of the vertical set being longitudinally straight and those of the horizontal set being longitudinally conformed to the bend of said plates, and field erecting the parts previously mentioned by temporarily bolting said plates of a lower tier to said perimeter flange with their adjacent vertical vertical edges in abutting relation, temporarily bolting the longitudinally straight templets to each abutting edge in seam-lapping relation along and within the vertical butt joints thus formed, with the upper ends of these templets protruding above the horizontal tank seam, positioning an upper tier of plates with bottom edges abutting the upper edges of those of the lower tier and with their adjacent vertical edges in staggered relation with respect to the vertical seams of the lower tier, positioning the horizontal templets in inside seam lapping relation along the horizontal seam and disposed in spaced relation between adjacent vertical seams of the lower and upper tiers, temporarily bolting together the horizontal edges of adjacent plates of the upper and lower tiers with said horizontal templets, similarly bolting the abutting vertical edges of the upper tier plates to one another with the vertical templets whose lower ends extend below the horizontal tank seam, aligning the abutting edges of said plates in proper welding relation by adjustment of said bolts, and then welding all adjacent plates to one another and to the base from outside the tank thus formed, and removing the templets and bolts and welding closed the remaining bolt holes.

2. The method of fabricating and erecting cylindrical tanks of metal which are large enough to require multiple tiers of side plates separated by a horizontal tank seam, which comprises shop fabricating a circular base formed at its perimeter for field attachment of the side sections of the tank, shop forming a plurality of metal side plates for the tank of rectangular outline with bolt holes spaced along the edges thereof, each of said plates consisting of a single sheet of metal, shop bending said plates along one dimension to the curvature of the perimeter of said base, shop forming vertical and horizontal sets of temporary edge connecting templets with bolt holes therein equally spaced with the holes in said plates, the templets of the vertical set being longitudinally straight and those of the horizontal set being longitudinally conformed to the bend of said plates, and field erecting the parts previously mentioned by securing the plates of a lower tier to the perimeter of said base with their adjacent vertical edges in abutting relation, temporarily bolting the longitudinally straight templets to each abutting edge in seam-lapping relation along and within the vertical butt joints thus formed, with the upper ends of these templets protruding above the horizontal tank seam, positioning an upper tier of plates with bottom edges abutting the upper edges of those of the lower tier and with their vertical seams staggered with those of the lower tier, temporarily bolting the lower edges of the plates of the upper tier to said upper protruding ends of said templets to properly position said plates, positioning the horizontal templets in inside seam lapping relation along the horizontal seam and disposed in spaced relation between adjacent vertical seams of the lower and upper tiers, temporarily bolting together the horizontal edges of adjacent plates of the upper and lower tiers with said horizontal templets, similarly bolting the abutting vertical edges of the upper tier plates to one another with the longitudinally straight templets, aligning the abutting edges of said plates in proper welding relation by adjustment of said bolts, and then welding all adjacent plates to one another from outside the tank thus formed, and removing the templets and bolts and closing the remaining bolt holes.

3. The method of fabricating and erecting cylindrical tanks of metal which are large enough to require multiple tiers of side plates separated by a horizontal tank seam, which comprises shop fabricating a circular base with an upstanding perimeter flange with spaced bolt holes therein for field attachment of the side sections of the tank, shop forming a plurality of metal side plates for the tank of rectangular outline with bolt holes spaced along the edges thereof, each of said plates consisting of a single sheet of metal, shop bending said plates along one dimension to the curvature of the perimeter of said base, shop forming vertical and horizontal sets of temporary edge connecting templets with bolt holes therein equally spaced with the holes in said plates, the templets of the vertical sets being longitudinally straight and those of the horizontal set being longitudinally conformed to the bend of said plates, and field erecting the parts previously mentioned by temporarily bolting said plates of a lower tier to said perimeter flange with their adjacent vertical edges in abutting relation, temporarily bolting templets of the vertical set to each abutting vertical edge in seam-lapping relation along and within the butt joints thus formed, positioning plates of an upper tier with bottom edges abutting the upper edges of those of the lower tier but extending horizontally across the vertical seams of the lower tier, whereby to stagger the vertical seams of the upper and lower tiers, positioning a pair of templets of the horizontal set in spaced relation along and within the lower edge of each plate of the upper tier with one such horizontal templet on each side of the vertical seam of the lower tier across which that plate extends, temporarily bolting said templets of the horizontal set to the lower edge of their plate and to the upper abutting edges of the plates of the lower tier, similarly bolting the abutting vertical edges of the upper tier plates to one another with the vertical templets, aligning the abutting edges of said plates in proper welding relation by adjustment of said bolts, and then welding all adjacent plates to one another from outside the tank thus formed, and removing the templets and bolts and plugging and welding closed the remaining bolt holes.

SAMUEL B. SETTLE.

REFERENCES CITED

The following references are of record in the file of this patent:

UNITED STATES PATENTS

| Number | Name | Date |
|---|---|---|
| 1,515,996 | Buchanan | Nov. 18, 1924 |
| 1,631,051 | Nichols | May 31, 1927 |
| 1,798,190 | Carter | Mar. 31, 1931 |
| 1,842,735 | Spence | Jan. 26, 1932 |
| 1,905,413 | Kramer | Apr. 25, 1933 |
| 1,965,736 | Dillman | July 10, 1934 |
| 2,108,409 | Peron | Feb. 15, 1938 |
| 2,126,997 | Kramer | Aug. 16, 1938 |
| 2,337,058 | McKee | Dec. 21, 1932 |